United States Patent
Mogul

(10) Patent No.: US 6,262,987 B1
(45) Date of Patent: Jul. 17, 2001

(54) SYSTEM AND METHOD FOR REDUCING LATENCIES WHILE TRANSLATING INTERNET HOST NAME-ADDRESS BINDINGS

(76) Inventor: Jeffrey C. Mogul, 320 O'Connor St., Menlo Park, CA (US) 94025

( * ) Notice: Subject to any disclaimer, the term of this patent is extended or adjusted under 35 U.S.C. 154(b) by 0 days.

(21) Appl. No.: 09/048,650

(22) Filed: Mar. 26, 1998

(51) Int. Cl.[7] .................................................. H04L 12/28
(52) U.S. Cl. ...................... 370/400; 370/401; 395/200.56
(58) Field of Search ................................... 370/400, 401, 370/405, 475, 466, 389, 392, 409; 709/245, 249, 227, 203; 395/200.56, 200.59, 651, 200.3, 200.68, 200.65

(56) References Cited

U.S. PATENT DOCUMENTS

| | | | |
|---|---|---|---|
| 5,617,540 | * | 4/1997 | Civanlar ........................ 395/200.11 |
| 5,884,038 | * | 3/1999 | Kapoor ........................... 395/200.56 |
| 6,016,512 | * | 1/2000 | Huitema ............................... 709/245 |
| 6,055,236 | * | 4/2000 | Nessett ................................. 370/389 |
| 6,119,171 | * | 9/2000 | Alkhatib ............................. 709/245 |
| 6,119,234 | * | 9/2000 | Aziz ................................. 395/200.59 |
| 6,151,601 | * | 11/2000 | Paperniak ............................. 707/10 |
| 6,154,777 | * | 11/2000 | Ebrahim ............................... 709/227 |

OTHER PUBLICATIONS

Internet Software Consortium: "Network Wizards Internet Domain Survey" Retrieved from the Internet: <http://www.nw.com/zone/WWW/report.html now moved to http://www.isc.org/ds/> retrieved on Mar. 12, 2001!.

* cited by examiner

Primary Examiner—Douglas Olms
Assistant Examiner—Ricardo M. Pizarro
(74) Attorney, Agent, or Firm—Oppenheimer, Wolff and Donnelly LLP; Leah Sherry

(57) ABSTRACT

In a distributed network of host computers, a system and method are provided for translating names and addresses of the host computers. The names of a substantial number of all of the host computers of the network are collected by probing the network from a collecting site. The names are stored in a table. Name-address bindings, which may include time-to-live information, are obtained for each of the collected names. The name-address bindings can be compressed and transferred to a cache memory of a recipient computer, such as, for example, a proxy server. The recipient computer receives translation requests for any of the name-address bindings stored in the memory. These translation requests can include first translation requests for the any of the name-address bindings stored in the memory. In response to the requests, including the first requests, the recipient computer replies the name-address bindings to reduce response latencies.

29 Claims, 2 Drawing Sheets

FIG. 2

SYSTEM AND METHOD FOR REDUCING LATENCIES WHILE TRANSLATING INTERNET HOST NAME-ADDRESS BINDINGS

FIELD OF THE INVENTION

This invention generally relates to translating-address bindings of Internet hosts, and more particularly to reducing latencies while translating the bindings.

BACKGROUND OF THE INVENTION

The Internet is a wide area network that connects computer systems (hosts) all over the world. Most of the hosts can be classified as server computers or client computers. The clients are mostly operated by end-users, while the servers provide various types of network services to the clients. In some cases, specialized work is performed by hosts called "proxy" servers. For example, gateways that connect intranets to the Internet typically include proxy servers that implement routers, fire-walls, tunnels, and the like. Many other types of proxy servers are known.

On the Internet, communications between Internet hosts requires the use of Internet Protocol (IP) addresses. Each communicated "packet," whether a request or reply, includes a source address of the sending host and a destination address of the receiving host. In the current IP version 4, these addresses are 32 bits arranged as multiple fields. The addresses are often written in a numeric form like "10.80.16.4". However, IP addresses in pure numeric form are hard for users to remember. Therefore, most user-visible forms of the addresses are represented as "names," for example, "www.digital.com." The association between a name and an address is known as a binding.

In order to translate between names and IP addresses, the Internet uses a Domain Name System (DNS). The DNS is a large, spatially distributed system with frequent updates while bindings are added, modified, or deleted. One step in almost all practical Internet operations is for a host to ask the DNS for a translation from a DNS name to an IP address. In some cases, the DNS is asked to translate from a known IP address to a corresponding DNS name.

Because DNS requests are frequent and may traverse long distances, the DNS includes a caching mechanisms. The cache will decrease the load on the Internet due to translation requests, and also make name look-ups quicker because the translations can be performed locally. To prevent the use of stale (out-of-date) cache entries, the DNS associates a "Time To Live" (TTL) value with each name-to-address binding. The TTL indicates the length of time that a particular binding is cached. After the TTL expires, the associated binding can be evicted from the cache.

While DNS caching does serve to eliminate a lot of the potentially necessary DNS requests, especially the transmission of many requests and responses over slow and costly wide area networks, there are still many circumstances when the latency of DNS look-ups is a significant performance problem due to cache misses. If there is a cache miss, the DNS has to go out on the network to load the cache with the required binding. A DNS cache incurs cache misses for the following reasons.

Traditional DNS caching can only result in a cache hit when a name translation is requested more than once. On the first request, the cache will not contain a cache entry. This is known as a "compulsory miss." This is inherent in the way DNS caches operate. Because excessively long TTLs make it difficult for a system administrator to change name-to-address bindings for hosts, most TTLs are typically set to durations of between a few hours and a few days. This means that an infrequently requested name translation may result in a DNS cache miss because the TTL has expired, and the binding has been evicted. This is known as a "time-out miss," and requires a time-consuming reload. In addition, the DNS cache may not be large enough to hold all of the possible name-to-address bindings. This may result in a "capacity miss."

Of these three kinds of misses, capacity misses can be avoided by simply increasing the cache size. According to the latest survey available at "http://www.nw.com/zone/WWW/report.html," the total number of DNS names reachable on the Internet is about 20 million, although this might be a significant underestimate. Even so, it would be relatively easy to cache one hundred million DNS translations on a single disk.

However, it is not nearly so easy to avoid compulsory or time-out misses. In order to avoid most compulsory misses, the DNS cache would have to be aware of most of the possible DNS names all of the time. In order to avoid time-out misses, the DNS cache would also have to probe the true DNS servers for each of the cached names at an interval commensurate with its TTL value. Should each DNS cache engage in this practice this would place an enormous load on the Internet and on the DNS servers.

In practice, the problem of DNS cache misses is most important at a site with a large fan-in or fan-out. For example, an HTTP "proxy" server must translate the DNS name to an IP address before each HTTP request can be forwarded. This adds latency to the forwarding path, increases the number of simultaneous operations in progress, and the number of operating system scheduling events per request. A large proxy deals with many servers, and so DNS caching tends to break down in this case.

In addition, a busy HTTP server may wish to keep an audit log based on host names. Therefore, the logging server has to do a reverse lookup, i.e., an address to name translation for each request. Experience has shown that this is prohibitively expensive when the host community is large because DNS caching is ineffective in this case. Therefore, most current HTTP servers keep their logs by IP address. The 32 bit addresses of the clients can be then post-processed into readable host name form, but this is still expensive, and the binding between host name and IP address sometimes changes before the post-processing can be performed, making the log inaccurate.

Another application where DNS cache misses might be important is in a large electronic mail (e-mail) server. Each e-mail message is addressed to one or more host names, and these host names must be translated to IP addresses before the server can deliver the mail. Also, many servers do reverse look-ups on arriving mail, so as to create an audit trail based on the host name of the server that sent the mail, i.e., the address in the "Received:" lines of an Internet e-mail header.

The HTTP proxy problem is the more severe because the translation is unavoidable and on the critical path for latency. Therefore, the invention disclosed below is primarily discussed with respect to HTTP proxies and servers, but the applicability of the invention to other Internet services, such as e-mail and FTP, etc. is quite similar.

In the prior art, most system operators have tried to resolve these problems by balancing the TTL value so that time-out misses are minimized without introducing excessive incoherency. Increasing the size of DNS caches can reduce capacity misses. However, no good solutions are known to the problem of compulsory misses at large sites.

Therefore, there is a need to reduce latencies associated with translating name-address bindings of Internet hosts, especially translations that suffer compulsory cache misses.

SUMMARY OF THE INVENTION

The invention provides a system and method for translating names and addresses of host computers connected by a network. A collecting site, either local or distributed, collects the names of a substantial number of all of the host computers. The collecting can be done by a "spider" or "crawler" (i.e., a system that locates as many Web pages as possible) of a search engine probing the network.

Name-address translations are obtained for each of the collected names. The names can be obtained using a standard Domain Name System (DNS).

The name-address bindings can be compressed, and optionally encrypted before they are transferred to one or more recipient computers (e.g., proxy servers). It may be preferable to use multicast transmission when there are multiple recipients. The recipient computers store the name-address bindings for all of the hosts in a cache memory.

Subsequently, the recipient computer receives translation requests. These translation requests can include "first" translation requests, i.e., a request to translate a particular name or address that has never before been processed. In response to the request, the recipient computer replies with the appropriate name-address binding even if the request is a first request. Thus, compulsory misses as would be incurred by a DNS are avoided to reduce response latencies.

In one aspect of the invention, the recipient computer generates the translation requests that it performs, rather than receiving them from another computer.

In another aspect of the invention, the cache memory is periodically updated to avoid time-out misses, and the cache is large enough to avoid capacity misses.

DETAILED DESCRIPTION OF THE PREFERRED EMBODIMENTS

Figure 1:
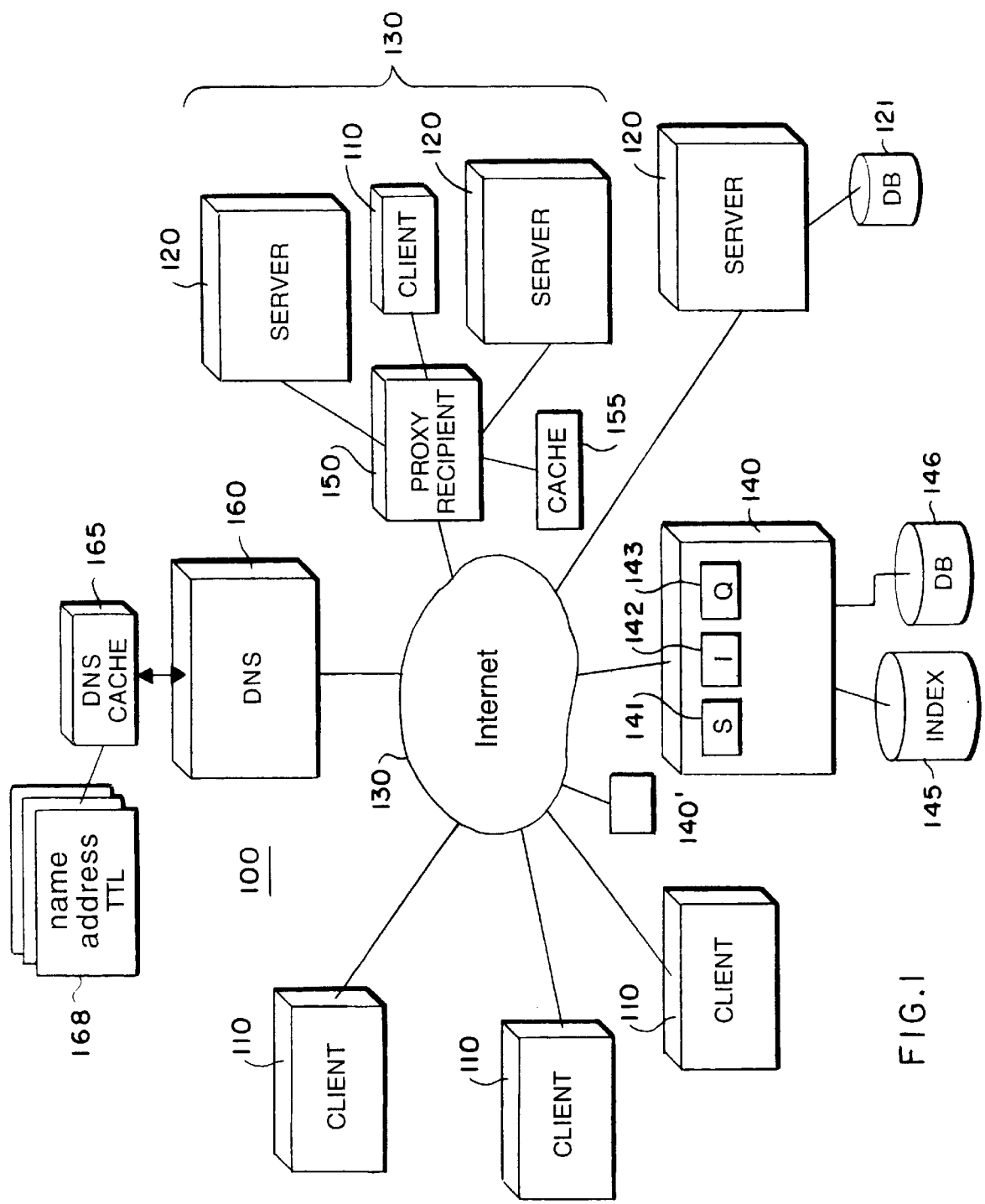
FIG. 1 is a block diagram of a distributed computer network that uses the invention.

FIG. 1 shows an arrangement 100 that uses the present invention. As shown in FIG. 1, a wide area network includes numerous host computers. The hosts can include client computers (clients) 110 connected to server computers (servers) 120 by the Internet 130. Some of the clients and servers can be connected by local area networks as an intranets. The network can also include "proxy" servers 150 that do work on behalf of servers 110 of, for example, a particular intranet 131.

The clients 110 can be any type of computer, personal computers, workstations, and portable devices, such as a laptop or personal digital assistant (PDA), and the like. Typically, the clients 110 are operated by end-users. The different number of ways that the clients 110 can be configured is too numerous to detail here.

The servers 120 are usually larger computer systems that provide numerous Internet services to the clients 110. For example, a server can maintain files, print queues, or higher level services typically accessed through pages. These services are well known.

The Internet 130 is a continuously changing communication environment that connects hosts all over the world using the Internet Protocol (IP). In the hosts, the protocol is defined by a TCP/IP implementation. The Internet also includes an application level interface called the Hyper-Text Transfer Protocol (HTTP) which holds together the World Wide Web (WEB).

As stated above, request and reply packets communicated among the hosts include 32 bit source and destination addresses. However, in many transactions performed by users, addresses are expressed as easier to remember names. In cases where names are specified, it is necessary to translate the names to proper 32 bit IP addresses. In some cases, it may also be necessary to translate addresses to names.

In the prior art, translation is generally performed by the Domain Name System (DNS) 160; a large, spatially distributed system with frequent updates to a cache 165. The cache 165 stores name-to-address binding and Time-to-Live (TTL) values 168. DNS caches frequently suffer compulsory, time-out, and capacity misses. It is the purpose of the invention to eliminate, as much as possible, name look-up misses or address look-up misses so that processing latencies are reduced, particularly compulsory misses.

As stated above, it would be prohibitively expensive for most hosts to avoid compulsory and time-out misses in DNS caches by their own efforts since DNS forces compulsory misses no matter the size of its cache.

The invention relies on the fact that it is quite possible to collect a significant portion of the required information required to do binding translations "directly" from the Internet. In particular, connected to the Internet 130 are "search engines" such as the Digital Equipment Corporation AltaVista™ search engine 140. The primary purpose of a search engine is to help users to locate Internet content, such as Web pages. The search engine 140 includes a "spider" (S) 141 that periodically or continuously scans the Web looking for changed or new pages. The pages are brought into to the search engine 140 to be indexed in a database 145 by an indexer 142. Users can pose queries to a query interface 143 to locate pages that match on the queries. Spiders are being quite sophisticated, and searching most of the Web in a reasonable amount of time for host names is possible.

As part of the inherent operation of the search engine 140, the names of almost all Internet Web servers are collected. The search engine 140 also collects a substantial portion of DNS translations for the names, although typically not on a time scale necessary to avoid most cache time-out misses.

As noted above, the actual amount of information represented by a complete cache of the DNS information for all known Web servers is small in terms of the cost for storing the information on disk. For example, the current number of host names known to AltaVista™ is about two million, although this number will certainly grow over time.

A trace made in 1996 shows that for about 140,000 server host names, the average length of the names was about seventeen bytes. Further, these names are highly compressible using standard compression techniques to an average of about seven bytes per name. If each entry also includes four bytes (32 bits) for each IP address, and another few bytes of TTL information, it is possible to compress all of the collected DNS information to fit an a 32 MegaByte disk 146, including the DNS information for servers with multiple addresses. With careful compression techniques, the amount of storage required can further be reduced.

Figure 2:
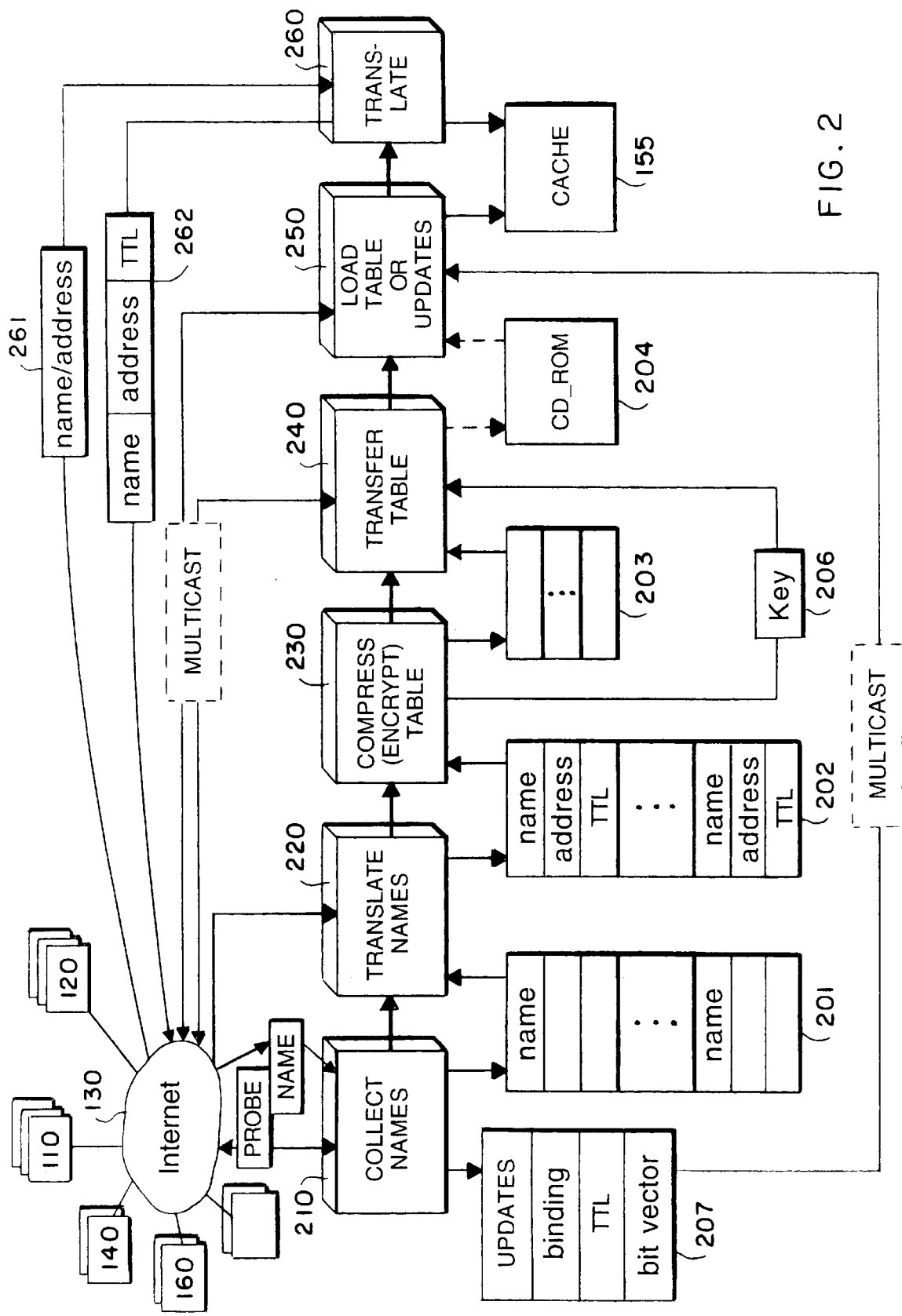
FIG. 2 is a flow diagram of a preferred embodiment of the invention.

As shown in FIG. 2, the basic problem of reducing the compulsory DNS cache miss problem for a large HTTP proxy site, or other similar application that require DNS translation services, is solved by the following system and method.

In step 210, almost all Internet host names are collected at a site, for example, the AltaVista™ search engine 140. The collected names are stored as a table on a disk. The collecting step can be part of the search engine's spider.

In step 220, the collecting site can, optionally request and obtain an address translation for each name in the table 201. The table 202 now has name-to-address bindings for each name. This step also produces the TTL values for the name-to-address binding. This step is not necessary because translation can later be performed when the table is placed in use. For example, the translations can be performed as part of the normal processing of translations request using the table, but probably at a greater cost.

In step 230, the table 202 can be compressed to reduce storage.

In step 240, the compressed table 203 is transferred to a recipient, for example, the proxy server 150. The transfer can be via the network 130 or portable storage media such as a CD-ROM 204. Alternatively, in step 240, the compressed table 203 is transferred to a recipient such as a server 120 or a client 210.

In step 250, the recipient decompresses the table, and loads it into its cache 155. The cache 155 is large enough to hold a table of name-to-address bindings for all known servers. A portion of the table can be stored in backing store, such as a disk, rather than in main memory of the recipient.

In step 260, the recipient performs DNS name-address translations using standard protocols and techniques without incurring compulsory misses. The translate requests 261 can be for names or addresses. The replies in response to the requests are name-address bindings 162, as long as the TTL is valid.

If the cache is large enough, then capacity misses are also avoided. If optional step 220 is performed by the collecting site, then time-out misses are avoided at least until the TTL expires for a particular name-to-address binding. Once the TTL does expire, or if the cache 155 is missing an entry, the cache 155 operates as a normal DNS cache would: it incurs a cache miss, and the binding is loaded. This means that no incorrect behavior results.

The cost of propagating the table 204 is not entirely insignificant, particularly when there are many recipients, e.g., multiple proxy, e-mail, and FTP servers of a particular intranet. For example, the compressed form of the table 203 is about 32 MegaBytes, and if the collecting and recipient site are connected via a "T1" link having a bandwidth of about 1.5 Megabits per second, then a network transfer would take about three minutes assuming no errors.

If the collecting site updates the table at a frequency that is about the lowest TTL used by most hosts, i.e., about once per hour, then the transfer cost is relatively small when viewed by the recipient 150, but potentially large when viewed by the collecting site 140 that has many recipient customers.

Several techniques can be used, individually or in combination, to reduce this propagation cost. In one technique, the collecting site simultaneously sends out the table 203 to a group of recipients as a "multi-cast." Since all recipients will want to have a copy of the same table, this is an ideal application for multi-cast.

In practice, the collecting site can encrypt the table 202 while compressing in step 230 so that only "paying" recipients can recover the information in the table. The collecting site can use a one-time key 206 for encrypting the actual table 202, and use a series of uni-casts to distribute the key 206 to each paying recipient via a more secure cryptographic mechanism.

The collecting site can incrementally update the table 201 and only transfer updates since the loading of the cache 155. Although TTLs in the DNS usually specify a relatively short time period, actual name-to-address bindings change relatively infrequently. Therefore, the main purpose of an incremental update is to separately communicate new TTL values to recipient sites on a more frequent basis.

In principle, each name-to-address binding can have a different TTL, which would make the updates rather large. However, in practice, the collecting site can avoid unnecessary updates by only sending out values that are less than or equal to the actual TTLs. This makes the "compression" a lot simpler. The incremental updates can also be sent out in multi-cast mode when this makes sense.

Because name-to-address bindings are relatively stable, updates mostly encodes only new TTL information for existing host names. It is possible to encode the updates so that a recipient site can miss an update without having to retrieve the entire table to catch up. This can be accomplished by using one update mechanisms for the table of names, and another for the TTL values.

If most bindings have a TTL value of over one hour, and the TTL update is sent once an hour, then the collecting site only has to indicate whether a host name is "good" for at least another hour. This can be done with a vector have one bit for each host name. A vector that consumes about 2 million bits or 250 KiloBytes taking only a fraction of a second to transfer over a T1 link. With some compression, this time can significantly be reduced. In other words, the currency of the cache 155 can approach that of a DNS cache with the added advantage that all known bindings are maintained.

As stated above, the collecting site keeps its table 202 up to date by periodically probing the DNS servers for each stored name to determine current TTL values, preferably some time before the TTLs expire. If the collecting site fails to obtain new information before an update is propagated, no harm is done because the recipient sites will soon realize that their cache entries have expired and the binding can be obtained from the DNS as in the prior art.

The probing of the DNS server by the collecting site can be moderately expensive. For example, to probe two million names once per hour requires about 555 probes per second. However, on the average, each individual DNS server will only receive one probe per name per hour from the collecting site. In addition, DNS already includes a mechanism, i.e., "zone transfers," that can significantly reduce this cost. Also, a centralized collecting site, such as the AltaVista™ search engine, already has the network capacity to handle this kind of request load; although the cost is not insignificant.

Note, the function of the collecting site, can easily be distributed among many multiple collecting servers 140 and 140' as shown in FIG. 1. Because each entry in the table 202 is essentially independent of all other entries, any one of a number of divisions of labor mechanisms can be implemented in steps 210. For example, distributed collecting sites can individually maintain tables that are merged to eliminate duplicates before or after transfer to the recipient sites.

Alternatively, a particular collecting site can collect names based on domain names, or geography, or network topology, or even some hash function over the name. The recipient sites can then assemble their caches from the collecting sites without much difficulty. This distribution of the collection site simplifies some of the capacity problems for probing, reduces the impact of the probing traffic on the Internet "core," see below, and also provides availability in the face of network or server failure.

In an alternative embodiment, it is possible to solve the DNS reverse look-up caching problem. This is the case, for example, where an HTTP server needs to translate a known IP address into a name, for its audit logs. Unfortunately, the scaling problem here is more severe, due both to the much larger number of host names involved, and the higher frequency at which client host name bindings change. The same general technique might be used, but perhaps with much less benefit.

It should also be understood that the function of the collecting site and the recipient computer can be merged into a single computer system so that the transfer of the table to the cache is a local operation. That is, the proxy 150 can be equipped with a spider 141 like the one of the search engine 140.

It should further be understood that the function of the recipient computer can be merged with either or both of a server computer and a client computer so that the translation requests are performed locally to this computer. That is, the server 120 or client 110 could be the direct recipient of the table 203 without need for an intervening proxy 150.

The present invention is most useful to customer sites with relatively high-latency connections to the "core" of the Internet. For example, Internet sites in Australia, such as proxy servers are typically several hundred milliseconds, or more, away from the bulk of the servers currently on the Internet. That is, most servers (the core) are located in the United States. Since DNS servers are most often located "near" the servers whose names they store, "remote" sites are more likely to be sensitive to the latency of DNS look-ups than sites located closer to the Internet core.

In a context where host names are gathered for use by e-mail server recipients, one cannot use a set of host names of Web servers to avoid compulsory misses because not all e-mail hosts are Web servers. However, one can still gather a sufficiently large set of e-mail server host names by extracting all of the host names found in a search engine spider's crawl over the Web; this is likely to be a superset of the set of mail server host names. Another approach extracts a large set of mail server host names from the mail server logs of a large Internet Service Provider (ISP), in other words the collection of names can be from different sources using different mechanisms.

In addition to HTTP server names and e-mail server names, the present invention can also be applied in other contexts, including but not limited to: Web client names, Web servers or proxies which need to know the DNS hostnames of their clients, participants in multi-cast applications, for use in identifying the source of a multi-cast transmissions, Internet Relay Chat (IRC), multi-player networked games, network management systems, networked software license management systems, Internet-based facsimile systems, authentication and authorization systems, electronic payment and micro-payment systems for Internet commerce.

Although this invention has been described as being of benefit in the Internet, it can also be of benefit when applied within "intranet" contexts, especially for intranets operated by large organizations, for example, multinational corporations, governments, and educational institutes. In large-organization intranets, one may often find high-latency paths similar to those found in the Internet.

The main problem addressed by the present invention is to eliminate most or all compulsory and time-out cache misses experienced by DNS caches, especially those used at large HTTP proxy sites. The goal is achieved by obtaining the necessary binding information at a collecting site, centralized or distributed, and then transferring the binding information to DNS-like caches at recipient customer sites, possibly using incremental update techniques.

The main advantage of the invention is fewer DNS cache misses, and therefore much reduced latency for likely users of DNS caches such as HTTP proxies. In addition, the present invention, depending on the protocols used by the collecting site, can reduce Internet traffic due to translation requests and replies.

It is understood that the above-described embodiments are simply illustrative of the principles of the invention. Various other modifications and changes may be made by those skilled in the art which will embody the principles of the invention and fall within the spirit and scope thereof.

I claim:

1. In a distributed network of host computers, a computer implemented method for translating names and addresses of the host computers, comprising the steps of:
   collecting the names of substantially all of the host computers by probing the network from a collecting site;
   obtaining a name-address binding for each of the collected names;
   storing the name-address bindings in a memory;
   receiving translation requests for any of the name-address bindings stored in the memory, the translation requests including first translate requests for any of the name-address bindings stored in the memory; and
   replying the name-address bindings in response to the translation requests including the first translation requests to avoid compulsory misses.

2. The method of claim 1 wherein the collecting site is a search engine that includes a means of discovering a plurality of Web sites on the network.

3. The method of claim 1 wherein the collecting site is an electronic mail server computer including mail server logs storing the names of the host computers.

4. The method of claim 1 wherein the name-address bindings are obtained prior to receiving the translation requests.

5. The method of claim 1 wherein the name-address bindings are obtained after receiving the translation requests.

6. The method of claim 1, further comprising the step of: compressing the name-address bindings in the memory.

7. The method of claim 1, further comprising the step of: obtaining a time-to-live value for each of the name-address bindings.

8. The method of claim 7 including a recipient computer including a cache memory for storing the name-address bindings.

9. The method of claim 8 including transferring the name address bindings from the collecting site to the cache memory of the proxy server computer.

10. The method of claim 9 including compressing the name-address bindings prior to transferring.

11. The method of claim 7 including a plurality of recipient computers, each recipient computer including a cache memory for storing a copy of the name-address bindings.

12. The method of claim 11 including transferring a copy of the name address bindings from the collecting site to each cache memory of each recipient computer.

13. The method of claim 12 wherein the copies of the name-address bindings are transferred from the collecting site to each cache memory of each server computer over the network in a multi-cast mode.

14. The method of claim 13 including encrypting each copy of the name-address bindings prior to transferring.

15. The method of claim 13 including compressing each copy of the name-address bindings prior to transferring.

16. The method of claim 7 wherein the name-address bindings are obtained from a distributed name system connected to the network.

17. The method of claim 7 including incrementally updating the name address bindings after collecting the names.

18. The method of claim 1 wherein each name-address binding includes a time-to-live value, and replying the name-address bindings for a particular translation request only if the time-to-live value is valid.

19. The method of claim 18 wherein the time-to-live values are incrementally updated after collecting the names to avoid time-out misses.

20. The method of claim 19 including only updating time-to-live values that are less than or equal to actual time-to-live values.

21. The method of claim 19 wherein the updating of the time-to-live values includes a bit vector, there being one bit for each time-to-live value, each bit indicating whether the corresponding time-to-live value is valid for a predetermined amount of time.

22. The method of claim 1 wherein the collecting site is distributed over a plurality of computers.

23. In a distributed network of host computers, a system for translating names and addresses of the host computers, comprising:

a collecting site probing the network for names of substantially all of the host computers;

a distributed name system connected to the network for obtaining name-address bindings for the collected names;

a recipient computer connected to the network, the proxy server computer including a memory for storing the name-address bindings;

means for receiving translation requests for any of the name-address bindings stored in the memory, the translation requests including first translation requests for any of the name-address bindings stored in the memory; and means for replying the name-address bindings in response to the translation requests including the first request translation requests to reduce response latencies.

24. The system of claim 23 wherein the distributed name system obtains a time-to-live value for each of the name-address bindings.

25. In a distributed network of host computers, a computer implemented method for translating names and addresses of the host computers, comprising the steps of:

collecting names of host computers by probing the network from a collecting site;

obtaining a name-address binding for each of the collected names;

storing a copy of the name-address bindings in a cache memory of each of a plurality of recipient computers;

receiving translation requests for any of the name-address bindings stored in the memory, the translation requests including first translate requests for any of the name-address bindings stored in the memory;

replying the name-address bindings in response to the translation requests including the first translation requests to avoid compulsory misses.

26. In a distributed network of host computers, a computer implemented method for translating names and addresses of the host computers, comprising:

collecting names of host computers by probing the network from a collecting site;

storing a table containing the collected names;

transferring the table to recipient computers each of which having a cache memory;

loading the table into the cache memory of each of the recipient computers;

obtaining and including in the table a name-address binding with an associated time-to-live value for each of the collected names;

storing a copy of the table containing the name-address bindings and associated time-to-live value in the cache memory of each of the recipient computers;

receiving translation requests including first translation requests for any of the name-address bindings; and replying the name-address bindings in response to the translation requests including the first translation requests to avoid compulsory misses.

27. The computer implemented method of claim 26 further comprising:

compressing the table; and after transferring the table to the recipient computers, decompressing the table.

28. The computer implemented method wherein of claim 26 the collecting site sends the table to the recipient computers as a multicast.

29. The computer implemented method wherein of claim 26 the obtaining and including in the table of the name-address binding with the associated time-to-live value can be accomplished in the collecting site or the recipient computers.

* * * * *

UNITED STATES PATENT AND TRADEMARK OFFICE
CERTIFICATE OF CORRECTION

PATENT NO. : 6,262,987 B1
DATED : July 17, 2001
INVENTOR(S) : Jeffrey C. Mogul

It is certified that error appears in the above-identified patent and that said Letters Patent is hereby corrected as shown below:

Title page,
Item [73], is missing and the assignee is not listed. Item [73] should be added and it should read:
-- [73] Assignee: Compaq Computer Corporation, Houston, TX (US) --;

Column 8,
Line 65, reads "9. The method of claim 8 including transferring the name" it should read
-- 9. The method of claim 8, including transferring the name- --

Column 9,
Line 8, reads "of the name address bindings from the collecting site to each" it should read -- of the name-address bindings from the collecting site to each --
Line 22, reads "ing the name address bindings after collecting the names." it should read -- ing the name-address bindings after collecting the names. --

Column 10,
Lines 50-51, read "28. The computer implemented method wherein of claim 26, the collecting site sends the table to the recipient com-" it should read
-- 28. The computer implemented method of claim 26, wherein the collecting site sends the table to the recipient com- --
Lines 53-54, read "29. The computer implemented method wherein of claim 26, the collecting site sends the table to the recipient com-" it should read
-- 29. The computer implemented method of claim 26, wherein the obtaining and including in the table of the name- --

Signed and Sealed this

Twelfth Day of November, 2002

*Attest:*

*Attesting Officer*

JAMES E. ROGAN
*Director of the United States Patent and Trademark Office*